United States Patent [19]

Kaspar et al.

[11] Patent Number: 4,846,409
[45] Date of Patent: Jul. 11, 1989

[54] PROCESS FOR THE PREPARATION OF GRANULES

[75] Inventors: Vaclav Kaspar, Cologne; Manfred Baecker; Horst Brandt, both of Odenthal; Friedrich Grimmelijkhuizen; Karlheinz Wolf, both of Leverkusen, all of Fed. Rep. of Germany

[73] Assignee: Bayer Aktiengesellschaft, Leverkusen, Fed. Rep. of Germany

[21] Appl. No.: 101,614

[22] Filed: Sep. 28, 1987

[30] Foreign Application Priority Data

Oct. 17, 1986 [DE] Fed. Rep. of Germany ....... 3635313

[51] Int. Cl.⁴ .............................................. B02C 19/00
[52] U.S. Cl. ....................................... 241/21; 241/25; 264/117
[58] Field of Search .................. 23/314, 313 FB; 427/213; 241/21, 23, 29, 24, 79.1, 25, 101.2; 264/117

[56] References Cited

U.S. PATENT DOCUMENTS 2,306,698 12/1942 Heller et al. .
4,238,199 12/1980 Rothbuhr et al. .

FOREIGN PATENT DOCUMENTS 24654 3/1981 European Pat. Off. .
2263968 7/1974 Fed. Rep. of Germany .
1469883 2/1967 France .
1511746 5/1978 United Kingdom .
1567734 5/1980 United Kingdom .

OTHER PUBLICATIONS

Chemie-Technik 6, 1-1977, pp. 277-283.

Primary Examiner—Mark Rosenbaum
Attorney, Agent, or Firm—Sprung Horn Kramer & Woods

[57] ABSTRACT

Low-dust, storage-stable granules are obtained in a continuous operating process in which the powder to be granulated is granulated in succession in a high-speed and low-speed mixing granulator, with the addition of a granulating liquid, and is then dried in a fluidized bed into which a liquid containing a binder is sprayed. The process is particularly suitable for the preparation of dyestuff granules which can easily be dispersed in the use medium.

8 Claims, 1 Drawing Sheet

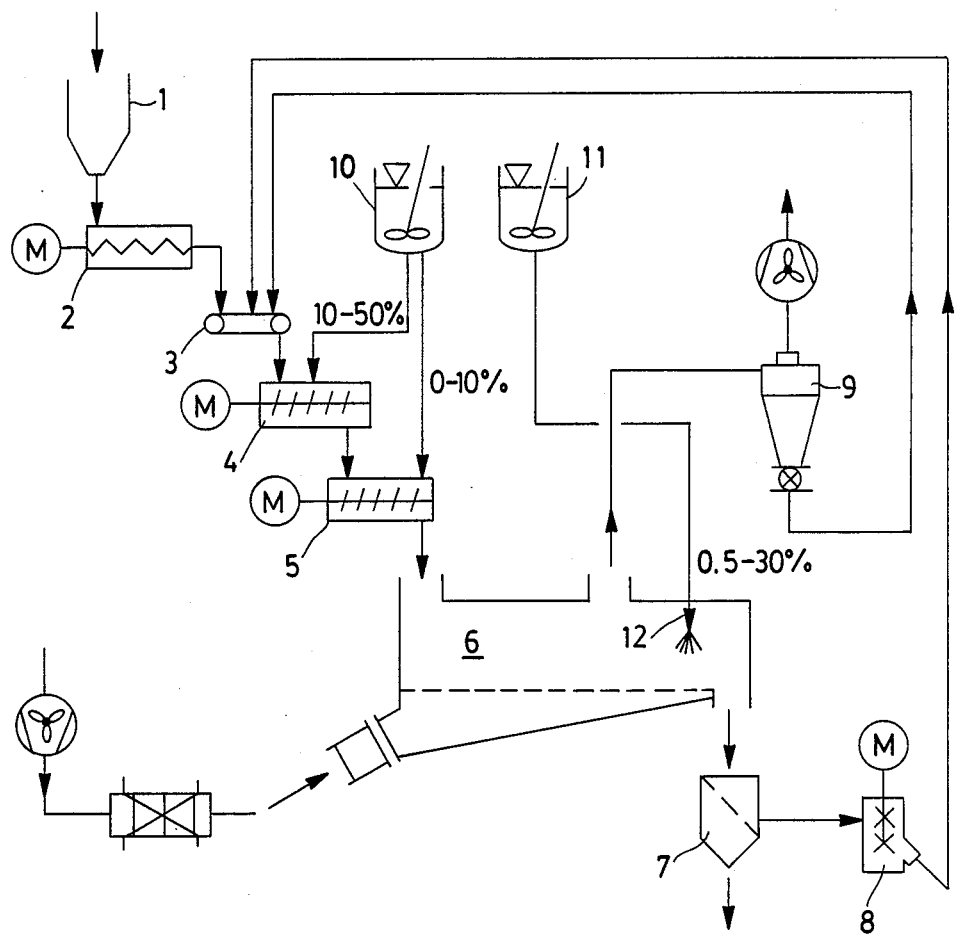

PROCESS FOR THE PREPARATION OF GRANULES

BACKGROUND OF THE INVENTION

The invention relates to a process for the preparation of storage-stable granules, in particular dyestuff granules, which are readily dispersible or are soluble in water, by build-up granulation.

It is already known (compare German Pat. No. A-2,716,478=British Pat. No. 1,567,734) that dyestuff granules can be produced by spraying an aqueous dyestuff solution into a fluidized bed of dyestuff particles.

It has furthermore been disclosed (compare German Pat. No. A-2,844,710=British Pat. No. 1,511,746) that granules can be produced by treatment of powdered pigments with granulating auxiliaries in a fluidized bed.

European Pat. No. A-24,654 proposes spraying aqueous formulations of reactive dyestuffs onto a fluidized bed, a similar technique for water-insoluble dyestuffs already having been described in German Pat. No. A-2,263,968.

However, the processes mentioned have the disadvantage that they necessitate high residence times and require large, expensive apparatuses to achieve high tonnages.

Finally, it is generally known (compare Chemie-Technik 6, 277) that granules can be produced by granulation in positive mixers, such as, for example, plough blade mixers, and subsequent drying in a fluidized bed. Nevertheless, these discontinuous processes are a method of preparing granules of low stability which are not abrasion-resistant and are used for further processing to tablets.

SUMMARY OF THE INVENTION

It has now been found that storage-stable granules can also be obtained continuously by granulation in positive mixers and drying in fluidized bed driers by a procedure in which the pulverulent material to be granulated, optionally formed with customary auxiliaries, is granulated in a high-speed mixing granulator with the aid of a granulating liquid and the product obtained is fed directly, that is to say without interruption of the product stream, to a slow-speed mixing granulator for subsequent granulation and is then dried, again without interruption of the product stream, in a fluidized bed drier while simultaneously being sprayed with a forming auxiliary.

The amount of granulating liquid to be metered in is 10-50, preferably 15-35% by weight in the first granulator and 0-10, preferably 0.1-5% by weight (based on the powder) in the second granulator.

The preferred granulating liquid is water, which is preferably added at 20°-30° C. and if appropriate can contain additives, such as buffer substances, surfactants, binders and the like.

The formulating auxiliaries fed to the drier are, in particular, 5-60% strength by weight aqueous solutions of binders and formulating agents, such as sugar, starch, caprolactam, alginates, dextrin, polyvinylpyrrolidone, polyvinyl alcohol and carboxymethylcellulose, surfactants, such as polyethylene oxides, polyethylene-propylene oxides, oxylalkylated fatty alcohols, lignin-sulphonic acids and alkylbenzenesulphonic acids, and dust removal agents, such as oil/emulsifier mixtures, possible "oils" being paraffin oil, phthalic acid esters and glycerol esters. The water-insoluble compounds mentioned last can also be sprayed as such, that is to say without the addition of water.

The amount used is 0.2-10% by weight of the powder composition.

The substances to be granulated are any desired organic, preferably water-soluble, substances, such as, for example, foodstuffs and luxury goods, plant protection agents, pharmaceuticals and above all dyestuffs.

Suitable dyestuffs are, in particular, cationic and anionic types of all substance classes and optical brighteners containing sulpho groups. Reactive dyestuffs and cationic dyestuffs of the azo series are preferred.

BRIEF DESCRIPTION OF THE DRAWINGS

FIG. 1 is a schematic representation of an apparatus for carrying out the process according to the invention.

DETAILED DESCRIPTION OF THE INVENTION

In carrying out the process according to the invention, the procedure is advantageously as follows:

The formulated dyestuff powder is metered continuously from the silo 1 via a metering screw 2 with the aid of a differential metering balance 3 into the mixer 4. Granulation takes place here with continuous addition of the granulating liquid from the tank 10. The product then passes to the mixer 5, into which further granulating liquid is sprayed as required. The moist granules are then dried continuously in the fluidized bed 6 with simultaneous spraying in 12 of the liquid taken from the tank 11, and are discharged via a sieve 7. Particles with a particle diameter >2.5 mm are comminuted in the disintegrator 8. The dust is removed from the air escaping from the bed drier 6 in the cyclone 9. The solids content thereby obtained is recycled.

Suitable high-speed mixers 4 are of horizontal or vertical construction. They are distinguished by low residence times (0.5-60 seconds) of the substances to be mixed.

The granulating liquid is metered in via pipelines under pressure or by atomization.

The mixing tools are made of abrasion-resistant material and can have various shapes, such as, for example, rotating blades, blunt mixing wings, paddles and the like.

The speed of rotation of the shaft is 800-3,000 rpm.

An example of such a mixer which may be mentioned in the "Recycler CB30" from Loedige, Federal Republic of Germany, or the Schugi, "Flexomix 160", Holland.

Suitable slow-speed mixers 5 are those in which the mixing tools are positioned on a horizontal shaft which has a speed of rotation of 60 to 250 rpm. The residence time here is 60-300 seconds.

The liquid is applied in the same way as in the mixer 4.

Plough blade mixers, for example the KM mixer from Loedige, have proved particularly suitable.

Commercially available fluidized bed or moving bed driers, for example those of the "Escher Wyss" type, which are advantageously equipped with jets, preferably two-component jets, in the last third of the drying cycle, are suitable for the continuous drying operation.

The granules obtainable by the process according to the invention are distinguished by a narrow particle size distribution, good free-flowing properties, good solubility or good redispersibility, transportation stability and an absence of dust.

EXAMPLE 1

1,300 kg/h of a commercially available monoazomonofluorotriazine dyestuff (6% residual moisture, Φ particle size 80 μm, bulk density 0.65 kg/l) are fed gravimetrically via a differential metering balance to a horizontally positioned, continuous granulation mixer (internal diameter 30 cm, length 120 cm, mixing shaft fitted with special mixing and conveying tools). Due to the high speed of the mixing shaft (1,500 rpm, corresponding to a peripheral speed of about 23.5 m/second), the product is distributed and moved in the form of a ring-shaped layer on the periphery of the mixer.

After the 1st third, 350 l/h of water are added through 3 tangentially positioned feed lines. After spontaneous mixing of the components, the formation of granules starts as the interaction between continuous agglomeration and deagglomeration.

The mixture in the form of granules leaves the granulating mixer with a residual moisture of 25.9%. The average particle size is now about 600 μm) and the bulk density is 0.72 kg/l*).
*) (all the values measured on dry goods)

The moist granules then pass to another continuously operating, cylindrical, horizontally positioned mixing drum (length 150 cm, diameter 50 cm). The centrally positioned mixing shaft, equipped with special mixing tools like plough blades, turns at 140 rpm, corresponding to a peripheral speed of about 3.7 m/second. The level of fill, regulated via a retaining dam in the discharge, is about 33%, corresponding to a residence time of the product in the mixer of about 150 seconds.

Close to the product intake shaft, 30 l/h of water are sprayed vertically from above onto the product bed.

The mixing tools and the water have both an agglomerating and a compacting effect. In the central section of the mixer, a mincer (1,500 rpm) comminutes larger agglomerates.

After leaving the 2nd mixer, the granulated material has a residual moisture of 27.3%, an average particle size of 800 μm and a bulk density of 0.83 kg/l.

The material thus produced then passes to a continuously operating fluidized bed drier. In the 1st section of the drier, the granulated product is dried to its original moisture at an air intake temperature of 140° C.

In the 2nd section, 150 l/hour of a 25% strength sugar solution are sprayed from above vertically onto the product bed via 5 jets. The product is simultaneously dried in the same section to the original moisture at an air intake temperature of 120° C.

In a 3rd section of the drier, the product is cooled to about 40° C. by fluidization with air at room temperature.

The flow rate, based on the total area of the Conidur base, is 0.8 m/second. Particles <150 μm are removed from the product stream by the fludizing air and pass to a subsequent cyclone with the waste air.

The granular stream of material leaves-the drier with a particle size spectrum of between 0.2 and 2.5 mm (median value 0.8 mm).

EXAMPLE 2

If the procedure is as in Example 1, but 30 l/h of dimethyl phthalate are used instead of the sugar solution in the fluidized bed drier, granules of similar quality are obtained.

EXAMPLE 3

If the reactive dyestuff in Example 1 is replaced by the cationic dyestuff Basic Yellow 28 (C.I. 48054) with a residual moisture of 3%, a particle size of 70 μm and a bulk density of 0.80 kg/l and only 200 l/h of water are used in the first mixer and 35 l/h of a mixture of 4 parts by weight of paraffin oil, 15 parts by weight of nonylphenol 6EO and 0.5 part by weight of water are used in the drier, perfect dyestuff granules are obtained under otherwise identical conditions.

EXAMPLE 4

If the procedure is as in Example 1 but the sugar solution is replaced by 52 kg/h of a 25% strength solution of polyethylene oxide of molecular weight 4000, abrasion-resistant, storage-stable, dust-free dystuff granules are obtained.

EXAMPLE 5

A 25% strength aqueous solution of a copolymer of ethylene oxide and propylene oxide with a molecular weight of 6800 and a similar granule quality is produced analogously to Example 4.

We claim:
1. A process for the continuous preparation of granules comprising:
   providing pulverulent material to be granulated,
   granulating the material with a granulating liquid in a high-speed mixing granulator with a shaft rotating at 800–3000 rpm,
   continuously feeding the product obtained from the granulator directly to a slow-speed mixing granulator for subsequent granulation and thereafter
   continuously drying the product in a fluidized bed drier while simultaneously spraying with a forming auxiliary, wherein the amount of granulating liquid added is 10 to 50% by weight in the high speed mixing granulator and 0 to 10% by weight in the slow speed mixing granulator.

2. The process according to claim 1, wherein the granulating liquid is water.

3. The process according to claim 1, wherein the forming auxiliary in the drier is used in amounts of 0.2–10% by weight.

4. The process according to claim 1, wherein the forming auxiliary is a liquid containing a binder.

5. The process according to claim 4, wherein the binder content in the auxiliary added to the drier is 5–50% by weight.

6. The process according to claim 1, wherein the speed of shaft rotating of the slow-speed mixing granulator is 60–250 rpm.

7. The process according to claim 1, wherein the material to be granulated is a dyestuff.

8. The process according to claim 1, wherein the speed of the high speed mixing granulator is 1500 rpm.

* * * * *